United States Patent [19]

Chen et al.

[11] Patent Number: 5,484,853
[45] Date of Patent: Jan. 16, 1996

[54] CRYOGENIC ADHESIVES MADE FROM EOPXY TERMINATED URETHANES

[75] Inventors: Der-Shyang Chen, Miao-Li Hsien; Hung-Chung Hsia, Tao-Yuan Hsien; Chen-Chi M. Ma, Hsinchu; Wang-Nang Wang, Tao-Yuan, all of Taiwan

[73] Assignee: China Technical Consultants, Inc., Taipei, Taiwan

[21] Appl. No.: 90,798

[22] Filed: Jul. 28, 1993

[51] Int. Cl.$^6$ .................................................. C08F 283/04
[52] U.S. Cl. .................. 525/454; 525/458; 525/524; 525/526; 525/528; 528/73
[58] Field of Search ............... 528/103, 73; 525/528, 525/524, 526, 454, 458

[56] References Cited

U.S. PATENT DOCUMENTS

| | | | |
|---|---|---|---|
| 3,445,436 | 5/1969 | Lake et al. | 528/73 |
| 3,624,178 | 11/1971 | Lohse et al. | 528/73 |
| 3,875,190 | 4/1975 | Habermeier et al. | 525/453 |
| 4,582,889 | 4/1986 | Yamaguchi et al. | 528/73 |
| 4,632,970 | 12/1986 | Hiza et al. | 525/460 |
| 4,749,743 | 6/1988 | Ambrose et al. | 525/327.3 |

FOREIGN PATENT DOCUMENTS 56-115781  9/1981  Japan.
58-145723  8/1983  Japan.

OTHER PUBLICATIONS

"Selecting Structural Adhesives for Temperature Extremes", Materials Engineering May 1978, pp. 45–47, 1980.
"Polyurethanes as Cryogenic Adhesives", Journal of Applied Polymer Science, vol. 9, pp. 3909–3916, 1965.

*Primary Examiner*—David Buttner
*Assistant Examiner*—Randy Gulakowski
*Attorney, Agent, or Firm*—Hitt Chwang & Gaines

[57] ABSTRACT

A two-part adhesive composition having superior adhesive strength at cryogenic temperatures contains a urethane resin composition part and a hardener part. The urethane resin composition part comprises 50 to 99% by weight of a modified polyurethane prepolymer having an epoxy group at each of its respective ends and 1 to 50% by weight of a modified urethane compound having substantially no ether cyanate (NCO) groups and at least two epoxy groups per molecule and a molecular weight of less than 800 daltons. The hardener part is a polyamine containing primary or secondary amine groups. The equivalent ratio of the amine groups of the polyamine to the epoxy groups of the urethane resin composition part is 0.5 to 2.0.

3 Claims, No Drawings

CRYOGENIC ADHESIVES MADE FROM EOPXY TERMINATED URETHANES

BACKGROUND

The present invention relates to a two-part adhesive composition, especially to a two-part adhesive composition containing a polyamine hardener, and a urethane resin composition comprising a modified polyurethane prepolymer having an epoxy group at each of its respective ends and a modified urethane compound having at least two epoxy groups.

In the aerospace industry, defense industry and semiconductor industry, an adhesive that is capable of hardening at room temperature and maintaining superior adhesive strength at cryogenic temperatures, such as −186° C. or lower, is desirable. Common type or high-temperature-resistant type adhesives generally suffer a rapid deterioration of adhesive strength and embrittlement at low temperatures due to the development of internal stress. Thus, they are not satisfactory for use in the aforementioned applications.

According to "Selecting Structural Adhesives for Temperature Extremes," pp. 5–78, *Materials Engineering* (Appendix 1), amine cured two-part urethane adhesives, silicone adhesives and polyamide modified epoxy adhesives are known to be capable of maintaining a high adhesive strength at cryogenic temperatures. However, amine cured two-part urethane adhesives are not suitable for use in highly humid environments. The adhesive strength of these amine cured two-part urethane adhesives is very sensitive to the dew point of the atmosphere during its application to substrates. Polyamide modified epoxy adhesives deliver much less adhesive strength than that of amine cured two-part urethanes, and are further limited by having to be cured at high temperatures (> 150° C.). Similarly, silicone adhesives generally deliver less adhesive strength than that of amine cured two-part urethanes at cryogenic temperatures; furthermore, their high temperature adhesive strength is not high either.

Aliphatic diamines are generally not used as hardeners for amine cured two-part urethane adhesives because they react too rapidly with the terminal ether cyanate groups of urethane prepolymers. Sandler, et al. (*Applied Polymer Science*, Vol. 9, pp. 3909–3916 (1965)) discloses a polyurethane adhesive composition that is suitable for use at cryogenic temperatures. The disclosed adhesive composition consists of an ether cyanate terminated urethane prepolymer made by reacting a polyetherpolyol with an excess amount of toluene diisocyanate (TDI). Then TDI or the condensation products of TDI and a polyol are reacted with a 3,3'-dichloro-4,4'-diaminodiphenylmethane (MOCA, Du Pont) hardener. However, the disclosed adhesive composition suffers from the fact that it must be cured at temperatures higher than 165° C.

SUMMARY

The present invention is to provide a two-part adhesive composition comprising an urethane resin composition part and a polyamine hardener part. The urethane resin composition part comprises about 50 to 99% by weight of a modified polyurethane prepolymer having an epoxy group at each of its respective ends and an average molecular weight of about 800–5000 daltons and about 1–50% of a modified urethane compound having substantially no ether cyanate groups and at least two epoxy groups per molecule and a molecular weight of less than about 800 daltons.

The urethane resin composition part and the polyamine hardener part of the two-part adhesive are stored separately and thoroughly mixed with each other immediately before use. The two-part adhesive mixture can then be hardened to the desired adhesive strength. Moreover, the adhesive strength of the described two-part adhesive increases as the temperature decreases such that the two-part adhesive has a superior adhesive strength at cryogenic temperatures, e.g., liquid nitrogen temperature. After hardening, the two-part adhesive has an excellent thermal shock resistance, that is, its adhesive strength will remain substantially unchanged after it goes through several cycles of rapid temperature variation from −198° C. to 80° C.

DETAILED DESCRIPTION

The ether cyanate terminal groups of urethane prepolymers react readily with moisture in the air and/or moisture on the substrate surface. This reaction will result in a substantial reduction of the adhesive strength of conventional adhesives containing ether cyanate terminated urethane prepolymers. In addition, the reaction of ether cyanate terminal groups with moisture in the air causes storage problems for the conventional ether cyanate terminated urethane containing adhesives. To overcome these problems resulting from the propensity of conventional two-part urethane adhesives to react with atmospheric humidity, while retaining the superior low temperature adhesive strength of conventional two-part urethane adhesives, the present invention discloses adhesive compositions comprising modified urethane prepolymers having epoxy terminal groups.

The present invention further discloses that the addition of an appropriate amount of a low molecular weight urethane compound, having at least two epoxy groups and essentially no ether cyanate groups, to the modified urethane prepolymer and hardener will substantially increase the resulting adhesive's adhesive strength at both room temperature and cryogenic temperatures (e.g., liquid nitrogen temperature).

The two-part adhesive composition of the present invention comprises a urethane resin composition part and a hardener part. The urethane resin composition part comprises from about 50 to 99% by weight of a modified polyurethane prepolymer having an epoxy group at each of its respective ends and from about 1 to about 50% by weight of a modified urethane compound having essentially no ether cyanate groups and at least two epoxy groups per molecule and a molecular weight of less than about 800 daltons. The hardener part is a polyamine containing at least two primary or secondary amine groups. The ratio of the amine groups of the polyamine to the epoxy groups of the urethane resin is about 0.5 to 3.0.

The 'epoxy group' of the present invention includes both oxirane

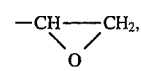

and epoxide,

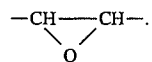

The urethane resin composition part of the present invention preferably comprises 60 to 80% by weight of a modified polyurethane prepolymer having an epoxy group at its respective ends, and 20 to 40% by weight of the modified urethane compound having at least two epoxy groups per molecule.

The preferred average molecular weight of the modified urethane prepolymer having terminal epoxy groups of the present invention is between 1000 to 3000 daltons. Its chemical structure can be represented by:

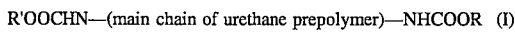

R'OOCHN—(main chain of urethane prepolymer)—NHCOOR   (I)

where each R and R' is an epoxy group containing aliphatic, cycloaliphatic, aromatic or alkyl aromatic groups; the average molecular weight of the urethane prepolymer main chain is between 300 to 3000 daltons, preferably between 500 to 2000 daltons.

The urethane compound having at least two epoxy groups of the present invention preferably has a molecular weight of less than 500 daltons. Its chemical structure is similar to (I), except that the main chain of the urethane prepolymer is replaced by relatively short chain groups such as aliphatic, cycloaliphatic, aromatic or alkyl aromatic groups or urethane oligomers.

The amine hardener of the present invention is a polyamine containing at least two primary or secondary amine groups. All polyamine compounds, oligomers and prepolymers that are suitable for curing epoxy resins are suitable hardeners of the present invention. Thus, xylylene diamine, isophorone diamine, ethylene diamine, diethylene triamine, etc. are all suitable hardeners of the present invention. The hardener can be a single compound, or can be a mixture of polyamine compounds, oligomers and prepolymers. Latent epoxy hardeners such as mercaptanes and acid anhydrides are viewed by the present invention as functionally equivalent to polyamines containing at least two primary or secondary amine groups. The ideal loading of the polyamine hardeners is to provide enough amine functionality to react with the epoxy groups of the urethane resin part. Suitable loadings have an amine/epoxy equivalent ratio of between 0.5 to 3.0, preferably between 0.8 to 1.5.

Urethane prepolymers having an epoxy group at each of its respective ends can be prepared by reacting an ether cyanate terminated urethane prepolymer having an average molecular weight between 300 to 3000 daltons, preferably between 500 to 2000 daltons, with a chemical compound containing both hydroxyl and epoxy groups (such as glycidol) or with a hydroxyl-containing epoxy oligomer until the ether cyanate content of the urethane prepolymer is essentially zero. The reaction between ether cyanate terminated urethane prepolymers and compounds having both hydroxyl and epoxy groups or hydroxyl-containing epoxy oligomers can be carried out at room temperatures, preferably at between about 60° and about 80° C. for about three hours. The hydroxyl to ether cyanate (OH/NCO) ratio should be greater than 1.0, yet preferably the ratio would be close to 1.0. During the reaction, a small amount of catalyst such as a tin compound can be added. The ether cyanate terminated urethane compound is prepared by reacting diisocyanates or polyisocyanates with polyols, using an ether cyanate to hydroxyl (NCO/OH) ratio of between 1.1 to 2.0. Methods for preparing such ether cyanate terminated urethane prepolymers are widely available in the literature and are well known to people skilled in the art. Examples of suitable diisocyanates or polyisocyanates for use in producing ether cyanate terminated urethane prepolymers are aliphatic, cycloaliphatic or aromatic diisocyanates or polyisocyanates, such as toluene diisocyanate (TDI), diphenylmethane diisocyanate (MDI), xylylene diisocyanate (XDI), hexamethylene diisocyanate (HDI), etc. Examples of suitable polyols for the reaction are low molecular weight glycols such as ethylene glycol, propylene glycol, butylene glycol, ethylene oxide or propylene oxide oligomers, or polyetherpolyols or polyesterpolyols having molecular weights between 300 to 2000 daltons, preferably between 500 to 1000 daltons, or mixtures thereof.

The preparation of the urethane compounds containing at least two epoxy groups can be prepared by reacting diisocyanates or polyisocyanates with an equivalent ratio of chemical compounds containing both hydroxyl and epoxy groups until the ether cyanate content is essentially zero. The only difference in the preparation of the urethane compounds containing at least two epoxy groups from the preparation of epoxy terminated urethane prepolymers is the choice of the ether cyanate containing reactants. Exactly the same reactants containing both hydroxyl and epoxy groups can be used to prepare both types of urethane compounds.

The "epoxy-terminated" urethane prepolymers and the two epoxy group containing urethane compounds can be prepared separately, then mixed together to obtain the urethane resin composition. Alternatively, the two types of urethane compounds may be made simultaneously in a single reaction. For example, an excess amount of diisocyanate can be used to react with polyols during the preparation of urethane prepolymers such that the NCO/OH ratio is between 2.0 to 4.0, preferably between 2.2 to 3.0. The reactants are then added to chemical compounds containing both hydroxyl and epoxy groups at a concentration equivalent to the unreacted ether cyanate groups. The chemical compounds containing both hydroxyl and epoxy groups will react simultaneously with the ether cyanate terminated urethane prepolymers and the unreacted diisocyanates to obtain a urethane resin composition containing both epoxy terminated urethane prepolymers and low molecular weight urethane compounds containing at least two epoxy groups. Analysis of the reaction products by Gel Permeation Chromatography proves the presence of two distinct molecular weight distributions resulting from the aforementioned reaction.

After the urethane resin composition is mixed with a hardener, the mixture will harden within several minutes to several hours at room temperature, depending on the specific composition of the hardener and the resin. In general, the maximum adhesive strength of the mixture can be obtained within three to seven days when the mixture is cured and stored at room temperature. However, maximum adhesive strength can also be obtained much quicker by curing the mixture at elevated temperatures (e.g., at 80° C. for 40 minutes, or at 120° C. for 30 minutes). The adhesives of the present invention are suitable for bonding surfaces of metals, plastics, ceramics and semiconductors.

EXAMPLES

The present invention can be illustrated by the following examples. However, it should be noted that the present invention is not limited to the examples given here.

EXAMPLE 1A

Preparation of the Epoxy Group Containing Urethane Prepolymers

Polytetramethylene glycol (DuPont Terathane 650), 130.3 grams, was added to a four-neck reaction kettle. The reaction kettle was swept with dried nitrogen while being stirred. Then 69.7 grams of toluene diisocyanate (TDI) was added. The reaction temperature was maintained at 70° C. After two hours, the ether cyanate content of the reactants was measured and found to be 8.4%. At this time, the reaction temperature was reduced to 60° C., then 29.7 grams of glycidol (Aldrich) was added. Subsequently, the reaction temperature was brought to 75° C. After about 3 hours, 0.25 grams of 10% tin dibutyl dilaurate was added. After about an hour, the ether cyanate content of the reactants was again measured and found to be zero. The reaction mixture was cooled and transferred to a proper container.

EXAMPLE 1B

Preparation of the Epoxy Group Containing Urethane Prepolymers

The same reaction conditions as described in Example 1A were used, but the polytetramethylene glycol was replaced with 140 grams of polypropylene glycol having a hydroxyl equivalent weight of 350 daltons (Arcol 1007, Chun-Long Co. Taiwan). Equivalent concentrations of TDI and glycidol were used as in Example 1A.

EXAMPLE 1C

Preparation of the Epoxy Group Containing Urethane Compound

Anhydrous butanone (112 grams) and TDI (91.4 grams) were added to a four-neck reaction kettle. Dried nitrogen was swept across the reaction kettle which was constantly stirred. Then 77.8 grams of glycidol was added and the reaction temperature was gradually increased to 75° C. After maintaining that temperature for about 5 hours, the ether cyanate content of the reactants was measured and found to be zero. The reaction mixture was cooled and transferred to a proper container.

EXAMPLE 2

Preparation and Adhesive Strength of the Adhesive Composition of the Present Invention The adhesive compositions A, B, C, and D of Table 1 were prepared by thoroughly mixing the respective ingredients into homogeneous mixtures. The bonding properties of the adhesives were measured by the lap shear strength of two aluminum sheets bonded together by the respective adhesive compositions. All the aluminum sheets were cleaned before use. The cleaning process was to first immerse the aluminum sheet into a cleaning solution made of 12% by weight of potassium dichromate, 20% by weight of 98% sulfuric acid and 68% by weight of water for about 30 minutes, then rinse the aluminum sheet with water and dry thoroughly in air.

It was observed that the adhesive compositions of Table 1 were generally cured within 30 minutes of application. Lap shear strength of the aluminum sheets are measured one week after the application of the adhesive compositions. The room temperature measurement was performed according to the ASTM D1002-72 method; the greater than room temperature measurement was performed according to the ASTM D1876-72 method; and the subambient temperature measurement was performed according to the ASTM D2557-72 method. The thermal shock resistance was measured by immersing a test sample into liquid nitrogen for 10 minutes, then transferring the test sample immediately into a baking oven maintained at 80° C. for another 10 minutes and then reimmersing the test sample into liquid nitrogen again. This process was continued through ten temperature cycles before a lap shear strength measurement was performed at a liquid nitrogen temperature. The test results of both lap shear strength and thermal shock resistance are listed in Table 2.

EXAMPLE 3

Effects of Hardener Type on the Adhesive Strength

Adhesive compositions E, F, G, and H of the present invention were prepared as described in Example 2, except various hardeners were used. The results are listed in Table 3.

Clearly the results of Table 2 and Table 3 illustrate that the adhesive compositions of the present invention possess outstanding adhesive strength and thermal shock resistance at liquid nitrogen temperatures. When a low molecular weight urethane compound containing at least two epoxy groups (Example 1C) was added to the adhesive composition according the present invention the adhesive strength of that composition was significantly increased.

Examples of Other Commercial Adhesives

Lap shear strength test samples were prepared by applying epoxy-polyamide or epoxy-polysufide adhesives to aluminum sheets and curing the adhesives at room temperature. The aluminum sheets were cleaned before use by the procedure described in Example 2. The test samples were stored at room temperature for one week before lap shear strength tests were performed at both room temperature and liquid nitrogen temperatures. The test results are listed in Table 4. The adhesive strength, as reported in the literature, of adhesives commonly recognized as having superior low temperature strength (i.e., polyurethane type and Epoxy-Nylon type adhesives) were also listed in Table 4 for illustration purposes. Comparing the data listed in Table 4 with that given in Table 2 and Table 3, it is apparent that the adhesive compositions of the present invention provide either equivalent or better adhesive strength than those commonly known low temperature adhesives. Furthermore, the adhesive compositions of the present invention have additional advantages (e.g., greater stability during storage, ease in processing, ambient temperature curability, and applicability to a multiplicity of substrates).

TABLE 1

|  | Example 1A (g) | Example 1B (g) | Example 1C (g) | Xylylene Diamine (g) |
|---|---|---|---|---|
| Adhesive A | 100 | 0 | 0 | 5.9 |
| Adhesive B | 0 | 100 | 0 | 5.7 |
| Adhesive C | 100 | 0 | 18.8 | 8.3 |
| Adhesive D | 100 | 0 | 37.6 | 10.6 |

TABLE 2

Lap Shear Strength and Thermal Shock Resistance At Various Temperatures

| | Lap Shear Strength, psi | | | | Thermal Shock Resistance psi |
|---|---|---|---|---|---|
| Adhesives | 60° C. | 25° C. | −56° C. | Liquid Nitrogen Temperature | |
| Adhesive A | 550 | 1800 | 4500 | 5150 | 3720 |
| Adhesive B | 750 | 2200 | 4750 | 5710 | 4400 |

TABLE 2-continued

Lap Shear Strength and Thermal Shock Resistance At Various Temperatures

| Adhesives | Lap Shear Strength, psi | | | Liquid Nitrogen Temperature | Thermal Shock Resistance psi |
|---|---|---|---|---|---|
| | 60° C. | 25° C. | −56° C. | | |
| Adhesive C | — | 2100 | — | 5860 | 4500 |
| Adhesive D | — | 3280 | — | 6720 | 5600 |

TABLE 3

| ADHESIVE COMPOSITION | Adhesive E | Adhesive F | Adhesive G | Adhesive H |
|---|---|---|---|---|
| Example 1A | 100 | 100 | 100 | 100 |
| Xylylene Diamine | 6.3 | — | — | — |
| Diethylene Triamine | — | 3.6 | — | 3.7 |
| Isophorone Diamine | — | — | 7.4 | — |
| Lap Shear Strength (psi) @ 25° C. | 2100 | 1850 | 1610 | 2200 |
| Lap Shear Strength (psi) @ Liquid N$_2$ Temperature | 8100 | 5390 | 6150 | 7520 |

TABLE 4

| | Lap Shear Strength, psi | | |
|---|---|---|---|
| | 25° C. | Liquid N$_2$ Temperature | Source of Data |
| Epoxy-Polyamide[a] | 2800 | 1605 | measured |
| Epoxy-Polysulfide[b] | 3750 | 1340 | measured |
| Polyurethane | 1800 | 4900 | Literature[c] |
| Epoxy-Nylon | 6000 | 5000 | Literature[c] |

[a]Epoxy = Epon 828 (Shell Chemical, Co., U.S.A.), 10 g; Polyamide = Versamid 125 (General Mills Inc., U.S.A.) 10 g.
[b]Epoxy = Epon 828 (Shell Chemical, Co., U.S.A.), 10 g; Polysulfide = Thiokol LP 3 (Thiokol Chemical Co., U.S.A.) 5 g.
[c]Appendix 1.

What is claimed is:

1. A two-part cryogenic adhesive composition comprising:

a urethane resin composition part comprising:
from about 60 to about 80% by weight of a modified polyurethane prepolymer having an epoxy group at each of its respective ends, wherein said modified polyurethane prepolymer has a weight average molecular weight of from about 1000 to about 3000 daltons; and
from about 20 to about 40% by weight of a modified urethane compound having substantially no free ether cyanate groups and having at least two epoxy groups per molecule with a molecular weight of less than about 500 daltons; and
a hardener pan comprising a polyamine having primary or secondary amine groups.

2. A two-part adhesive composition according to claim 1, wherein the ratio of said amine groups of said polyamine to said epoxy groups of said urethane resin composition part is from about 0.5 to about 2.0.

3. A two-part cryogenic adhesive composition comprising:

a urethane resin composition pan comprising:
from about 60 to about 80% by weight of a modified polyurethane prepolymer having an epoxy group at each of its respective ends, wherein said modified polyurethane prepolymer has a weight average molecular weight of from about 1000 to about 3000 daltons; and
from about 20 to about 40% by weight of a modified urethane compound having substantially no free ether cyanate groups and having at least two epoxy groups per molecule with a molecular weight of less than about 500 daltons;
a hardener part comprising a polyamine having primary or secondary amine groups; and
equivalent ratio of said amine groups of said polyamine to said epoxy groups of said urethane resin composition part being from about 0.5 to about 2.0.

* * * * *

UNITED STATES PATENT AND TRADEMARK OFFICE
CERTIFICATE OF CORRECTION

PATENT NO. : 5,484,853
DATED : January 16, 1996
INVENTOR(S) : Chen et al.

It is certified that error appears in the above-indentified patent and that said Letters Patent is hereby corrected as shown below:

On the cover page, in the title, delete "EOPXY" and insert therefore -- EPOXY --.

Col. 1, in the title, delete "EOPXY" and insert therefore -- EPOXY --.

Col. 8, line 16, in Claim 1, delete "pan" and insert therefore -- part --.

Col. 8, line 24, in Claim 3, delete "pan" and insert therefore -- part --.

Signed and Sealed this

Twenty-third Day of April, 1996

Attest:

BRUCE LEHMAN

*Attesting Officer*  Commissioner of Patents and Trademarks